United States Patent [19]
Brand

[11] 3,889,938
[45] June 17, 1975

[54] GAS PEDAL BIASING DEVICE

[76] Inventor: Robert Brand, 3568 Markam, Las Vegas, Nev. 89121

[22] Filed: Mar. 8, 1974

[21] Appl. No.: 449,216

[52] U.S. Cl. ................................. 267/153; 74/526
[51] Int. Cl. ............................................. F16f 1/32
[58] Field of Search ........... 267/153, 152, 140, 141, 267/63; 74/513, 563, 526; 251/295

[56] References Cited
UNITED STATES PATENTS

| | | | |
|---|---|---|---|
| 2,910,888 | 11/1959 | Bengsten | 74/564 |
| 3,166,950 | 1/1965 | Pomeranz | 74/526 |
| 3,526,154 | 9/1970 | Niedek | 74/526 |

*Primary Examiner*—James B. Marbert
*Attorney, Agent, or Firm*—Edward J. Quirk

[57] ABSTRACT

A device for biasing a motor-vehicle accelerator pedal toward the driver comprises a wedge-shaped piece of foam sponge material having adhesive on at least one side thereof for attachment between the pedal and floorboard. Use of the device according to the invention results in a substantial increase in gasoline mileage and reduction in air pollutant production.

4 Claims, 4 Drawing Figures

PATENTED JUN 17 1975　　3,889,938

GAS PEDAL BIASING DEVICE

BACKGROUND OF THE INVENTION

This invention relates to an improvement in automobile accelerator pedals, and more particularly to an accessory biasing device which is secured between the accelerator pedal and opposing floorboard.

Most accelerator pedals in contemporary cars comprise a rubber-covered rigid plate which is adapted to receive the driver's foot. The pedal generally is rigidly fixed to a metal rod which depends from beneath the dashboard, and which in turn is connected by a mechanical linkage system to operate the valve system of the carburetor or fuel injection system, thereby controlling the flow of fuel to the engine. On older car models the pedal may be hingedly attached to the floorboard at the heel end, but on newer models the pedal is usually freely suspended from the top, or toe end. A spring in the linkage acts to hold the accelerator pedal in an elevated or inactive position, such that when the driver's foot releases the pedal from a depressed position, the pedal automatically returns to the maximum elevated position, and the fuel flow to the engine is reduced to its minimum, or idling, level. The force of the spring is sufficient to return the pedal to its inoperative level, but provides very little resistance to depression of the pedal by the driver. As a result of the type of pedal biasing used in automobiles, a driver does not sense a significant increase in resistance to movement of the pedal from its idling position to its fully depressed position.

The ease of depression of an accelerator pedal results in unnecessary fuel consumption and a decrease in the efficiency of operation of the engine. When the pedal is rapidly depressed, the engine is momentarily unable to convert the substantial increase in fuel into useful energy. A portion of the hydrocarbon remains unburned or only partially combusted in the cylinder, resulting in an increase of smoke and other pollutants in the exhaust effluent. With the exception of rare emergency situations where very rapid acceleration is needed, the fuel which is converted into useful energy is largely wasted, since fuel efficiency during rapid acceleration is very low. An experienced driver who is trained to be conscious of slight movements in the accelerator pedal can minimize these upsets, thereby significantly increasing fuel efficiency. However, because of the plentiful availability and low cost of gasoline, in the past most drivers have not been concerned with efficiency of fuel utilization and therefore have unconsciously developed driving habits which are wasteful of fuel and detrimental to the environment.

Recently, shortages of gasoline and increasing social concern with air pollution problems have made drivers more aware of the desirability of conserving fuel through improved driving skills. Most drivers have found changing their long-ingrained habit of over-depressing the gas pedal to be very difficult, however, since drivers do not usually concentrate on the mechanics of driving their cars; apparently, the operation of a car is a sufficiently common experience that the mechanics of driving are mentally subjugated to a subconscious level.

It has now been discovered that the placement of a wedge of resilient sponge material between the bottom surface of the accelerator pedal and the floorboard results in a remarkable increase in efficiency of fuel utilization, improving gasoline mileage often by as much as 20–25%. The sponge material provides a soft but continually increasing resistance as the pedal is depressed. The sponge wedge does not interfere with emergency acceleration, since the pedal can still be depressed sufficiently to obtain maximim acceleration, but the resistance imparted to the pedal gives the driver a much better "feel" and awareness of the degree of depression of the pedal.

The use of a sponge material in association with an accelerator pedal has been described in Smith, U.S. Pat. No. 3,287,992, issued Nov. 29, 1966, wherein a sponge material sandwiched between two rigid plates is attached to the top of the pedal. Attached in this manner, the sponge acts in series with the accelerator biasing spring, and the sponge is compressed by the driver's foot before the pedal is actually depressed, and the sponge does not act to bias the pedal toward its idling position. In my invention, it is important for reasons of safety that the driver's foot be in direct contact with the gas pedal, with no exposed extension which might cause foot interference in movement between brake and gas pedals and that the first increment of motion of the pedal encounter the least resistance. Since fuel is wasted mostly when the accelerator is more fully depressed, it is important that the driver's foot encounter slightly increasing resistance as the pedal is depressed. Since the sponge wedge retains a finite thickness, usually about one-half inch, even when fully compressed under the pedal, it also acts as a stop for the pedal being fully depressed to the floor. In the last increment, e.g., about one-half inch, of motion of the pedal to the floor, almost all of the extra fuel is wasted.

SUMMARY OF THE INVENTION

The invention comprises a resilient foam wedge attached to the underside of a gas pedal to provide increasing resistance to foot pressure as the pedal is depressed.

DETAILED DESCRIPTION OF THE INVENTION

Figure 1:
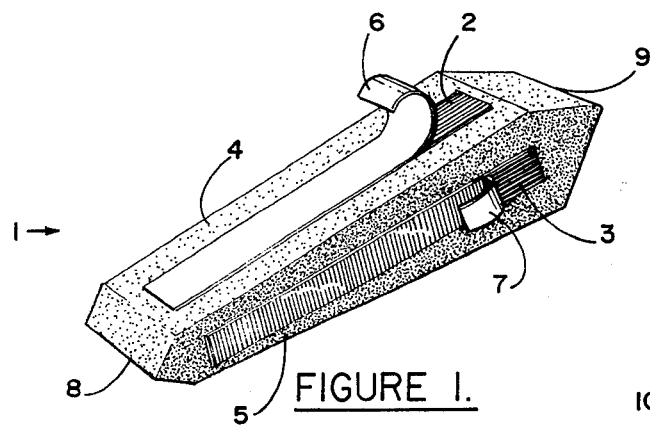
FIG. 1 shows a sponge wedge having adhesive on two sides for attachment to the gas pedal or floorboard.

FIG. 1 shows wedge 1 having adhesive surfaces 2 and 3 on the top and side surfaces 4 and 5, respectively, of the wedge. The adhesive surfaces are covered with protective vinyl strips 6 and 7 when the adhesive is not in use, and are simply stripped away to expose the adhesive when the wedge is ready to be secured in place. The heel end 8 and toe end 9 of the wedge are triangular in vertical cross-section so as to not interfere with any hinging mechanism which in some cars fastens the heel or toe of the pedal to the floorboard.

The adhesive material 2 and 3 is used to fasten the wedge in place either by attaching to the underside of the gas pedal or the top of the floorboard surface. The adhesive may be placed on all four elongated sides to allow securing of the wedge under the pedal in the most advantageous position. Since accelerator pedals have various distances, angles, and relationships to the corresponding opposing floorboard surface in various cars, it may be appropriate in some cases to invert the heel and toe ends of the sponge, or to turn the wedge on its side to achieve the best fit under the pedal. Ideally, the wedge will just fit in its natural condition between the accelerator pedal and the floorboard, with the pedal in idling position, without any spaces between the wedge surfaces and the pedal and floorboard surfaces, as shown in FIG. 2.

Figure 2:
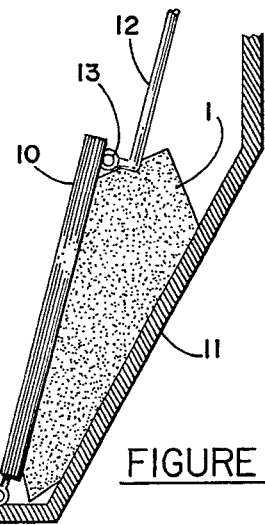
FIG. 2 shows a wedge in place between an accelerator and floorboard.

FIG. 2 shows the wedge 1 in place between accelerator pedal 10 and opposing floorboard 11. The pedal, which is shown in idling or non-operation position, is suspended from linkage arm 12 and is fixed to the arm at joint 13. The heel of the pedal is hinged at joint 14. The pointed heel of the wedge keeps the wedge from interfering with the operation of the hinge.

Figure 3:
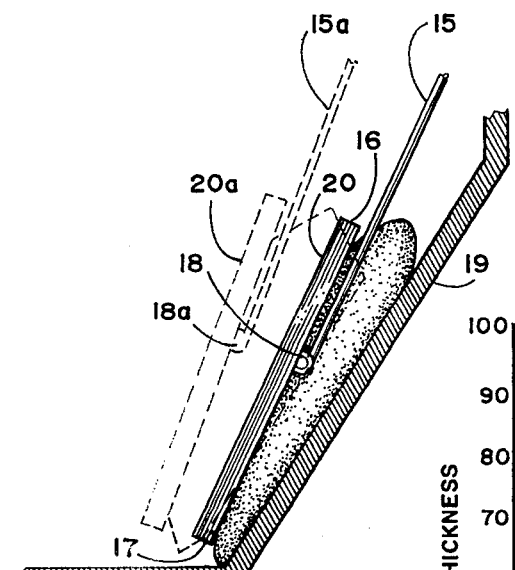
FIG. 3 shows the wedge similar to FIG. 2 but showing the accelerator pedal in depressed position.

FIG. 3 shows the placement of the wedge with the pedal partially depressed. The pedal illustrated in FIG. 3 is a "free-floating" type that is suspended from linkage arm 15 but is not hinged at either the top 16 or heel 17 of the pedal to the floorboard 19. The pedal is shown in phantom with corresponding numbers designated by the character "a", in the idling position. The linkage arm 15 is attached at point 18 at about the middle of the pedal 20. The pedal may be immovably attached at point 18, or may swivel in limited rotation about an axis perpendicular to the plane of the drawing through point 18. This enables the pedal to adjust to the position of the right foot of drivers of differing heights. The type of pedal is generally insignificant with regard to the invention, except that the wedge must be positioned or shaped properly to fit between the pedal and the floorboard. Sponge sheets of the type used in the invention are easily cut with a scissors or razor to the appropriate size and shape.

The wedge may be made of any shape which will fit between the gas pedal and the floorboard, but for reasons of safety should have a width which does not exceed the width of the gas pedal. It is not necessary that the wedge fill up the entire space between the pedal and floorboard when the pedal is in idling position; for example, the wedge can be fixed to either the floorboard or the underside of the pedal, and compressive contact may not be made for the first one-half inch or so of pedal travel. However, best results are obtained when a snug fit is obtained between the wedge and the floorboard and pedal surfaces when the pedal is in its idling position.

The wedge is preferably a four-sided elongated figure in design, and may have pointed ends as shown in FIG. 1 for convenience in abutting sloping surfaces under the accelerator pedal. The wedge is preferably thicker at one end than the other, since the toe and heel ends of most pedals are not equidistant from the floorboard. In this case, the wedge is shaped like a four-sided truncated pyramid. Ideally, the length and width of the wedge are the same as the length and width of the gas pedal, but may be slightly smaller. In a particularly preferred embodiment, the width of the wedge is different from its thickness so that if the width of a premade wedge more appropriately fits the space between the pedal and floorboard, the wedge may be rotated 90° for fitting under the pedal.

The wedge may be adhered to the pedal or to the floorboard by any adhesive means. The wedge as manufactured may have an adhesive strip on the top and/or bottom which may be exposed by removing a protective plastic covering. Or, double-sided adhesive tape may be supplied separately and cut to fit the wedge. If the wedge is encased in a protective material, such as fabric or plastic, the covering may be constructed to fasten to the pedal. For example, a material covering could slip over the gas pedal to hold the sponge wedge in place. It is very important that the wedge be immovably fastened under the pedal, since slippage or loosening of the wedge could possibly create a safety hazard.

The wedge may be made of any sponge-type material, such as flexible polyurethane foam or latex rubber foam. If the sponges are individually fabricated, it is preferred to form the wedges in a closed mold such that a water-impermeable crust is formed on the outside of the wedge. In this case, the sponge will not absorb water or other undesirable material from the floor of the car. If the wedge does not have an outer crust, it may desirably be coated with a rubber or plastic material, either by wrapping, or by dipping in or spraying with a water-impermeable coating. The wedges can be made most easily by simply cutting a large piece of foam to the appropriate size with scissors.

The physical characteristics of the wedge are quite important. It has been found that most drivers are comfortable with a wedge that requires a total of 5–10 pounds of additional pressure on the accelerator to move the accelerator over the first 50% of its stroke. This provides sufficient resistance to effect a smoothing of accelerator action during normal driving, to prevent the driver from unnecessarily overusing the accelerator. The following examples indicate the effect of the wedge on foot pressure:

EXAMPLE I

A 3 inch thick, 22 square inch (top area) rectangular wedge of standard resilient polyurethane foam was placed in a device for measuring compression and the forces required to compress the wedge to various thicknesses were measured. The resultant compressive force represents the additional biasing force created on an accelerator pedal by the wedge.

| Force required, lbs. | Wedge height, in. |
| --- | --- |
| 0 | 3 |
| 5 | 2.5 |
| 7 | 2 |
| 8 | 1.5 |
| 10 | 1 |
| 20 | 0.75 |

EXAMPLE II

A similar test was carried out with a polyurethane sponge having a 4 inches height and 16.5 square inch surface.

| Force required, lbs. | Wedge height, in. |
| --- | --- |
| 0 | 4 |
| 5 | 3 |
| 6 | 2.5 |
| 7 | 2 |
| 8 | 1.5 |
| 9 | 1 |
| 18 | 0.75 |

These examples indicate that actual compression of the wedge largely took place under 10 lbs pressure, mostly between 5 and 10 pounds. A wedge having these characteristics was determined by test drivers to have the most desirable "feel" during driving.

The characteristics of the sponge material used to make the wedge is also quite important. Since it is desirable to make the wedge with a top surface approximating the area of the gas pedal, the area of the wedge will normally be about 12–18 square inches. Therefore, the compressive qualities of the sponge are important for determining the force required to depress the pedal.

Figure 4:
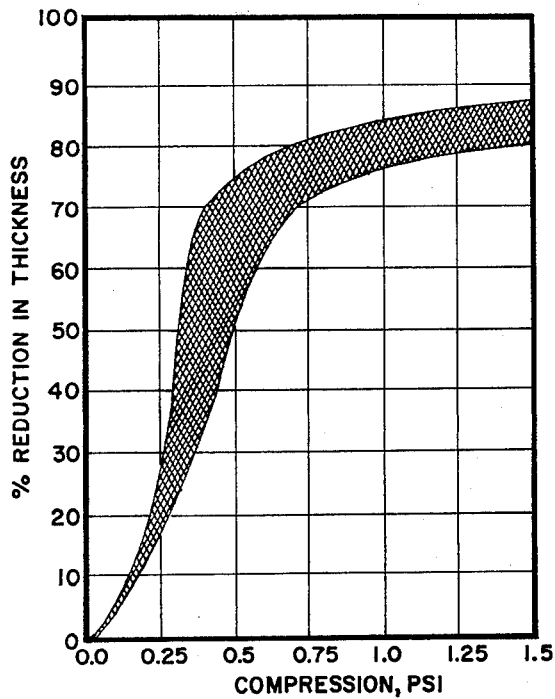
FIG. 4 is a graph showing desired compressibility characteristics of the wedge.

FIG. 4 shows a graph indicating the percent reduction in height of a wedge sample under varying pressures. It can be seen that a relatively narrow band of compressibility is appropriate for use according to the invention. If a more easily compressed sponge material is used, the driver will not feel sufficient biasing force under the pedal to change his habits, whereas, if a stiffer sponge is used, the pedal will become uncomfortably difficult to depress. As a rule of thumb, the wedge should be compressed to 50 percent of its original height at pressures between 0.25 and 0.5 psi. The graph shown in this figure is relatively accurate for wedges between about 3 inches and 5 inches in height. The sponge wedge has another inherent advantage in preventing "floorboarding"; while relatively small increases in pressure are required to compress the wedge up to about 75% of its thickness, the pressure required for further compression increases at a very fast rate as is apparent from FIG. 3. Sponge materials having these characteristics are readily available commercially.

Excellent and surprising results have been obtained with the resilient sponge wedge in actual usage. In one 700 mile test, a 1970 Ford V-8, with a 302 cubic inch engine, air conditioning, and power steering, which averaged about 15 miles per gallon during normal driving, averaged 18.9 miles per gallon with the wedge in place. In another test with the wedge in place for 1358 miles, a 1963 Plymouth, 6-cylinder 225 cubic inch engine with automatic transmission and air conditioning increased gas mileage from 15 mpg to 18.8 mpg — an increase of about 25%. In another 325 mile test on open highway, a 1969 Plymouth Sport Fury with a 383 cubic inch engine increased its efficiency from about 14 to over 18 mpg. Increases in gas efficiency also result in a much lower level of unburned hydrocarbons in the exhaust, materially lessening air pollution. In addition, the smoother operation of the car lessens oil consumption and wear on many critical parts, such as the transmission and tires.

I claim:

1. A device for imposing increasing resistance on a freely suspended accelerator pedal of a motor vehicle as the pedal is depressed comprising a resilient foam sponge wedge having compressibility characteristics such that the wedge is compressed to 50% of its normal thickness when the wedge is subjected to a pressure of between about 0.25 and 0.50 psi, said wedge having the shape of an elongated four-sided figure having an increasing cross-sectional area substantially along its length and being adapted to fit between the accelerator pedal and the opposing floorboard such that the pedal is biased toward its idling position by the resiliency of the wedge when the pedal is depressed.

2. The device of claim 1 wherein the wedge carries adhesive means on at least two adjacent sides thereof for securing the wedge between the accelerator pedal and the floorboard.

3. In combination, a freely suspended accelerator pedal for a motor vehicle having a continuous range of positions from idling to fully depressed, a floorboard located in opposing position to said pedal and having means to arrest the travel of the pedal at its fully depressed position, and a soft, resilient wedge having the shape of an elongated four-sided figure having an increasing cross-sectional area substantially along its length, and having compressibility characteristics such that the wedge is compressed to 50% of its normal thickness when the wedge is subjected to a pressure of between about 0.25 and 0.50 psi, said wedge being secured between said pedal and said floorboard such that depression of the pedal encounters increasing resistance from said wedge.

4. The combination of claim 3 wherein the wedge carries adhesive means on at least two adjacent sides thereof for securing the wedge between the accelerator pedal and the floorboard.

* * * * *